United States Patent [19]

Smith et al.

[11] Patent Number: 5,608,757

[45] Date of Patent: Mar. 4, 1997

[54] HIGH SPEED TRANSPORT SYSTEM

[75] Inventors: David M. Smith; Oscar A. Tovar, both of Plano, Tex.

[73] Assignee: DSC Communications Corporation, Plano, Tex.

[21] Appl. No.: 253,339

[22] Filed: Jun. 3, 1994

[51] Int. Cl.$^6$ .................................................. H03H 7/30
[52] U.S. Cl. .......................... 375/229; 375/257; 375/285; 375/346; 375/371; 333/28 R; 333/166; 379/398; 379/416
[58] Field of Search .................................. 370/7, 27, 32.1, 370/85.14; 379/398, 400, 403, 406, 411, 416, 417; 333/18, 28 R, 166; 375/211, 214, 215, 219, 229, 257, 371, 285, 346

[56] References Cited

U.S. PATENT DOCUMENTS

| | | | |
|---|---|---|---|
| 4,123,625 | 10/1978 | Chow | 375/214 |
| 4,431,578 | 2/1984 | Groenhof | 252/573 |
| 4,484,336 | 11/1994 | Catchpole et al. | 375/214 |
| 5,036,529 | 7/1991 | Shin | 375/373 |
| 5,058,130 | 10/1991 | Park | 375/12 |
| 5,305,350 | 4/1994 | Budin et al. | 375/257 |
| 5,374,861 | 12/1994 | Kubista | 326/30 |
| 5,425,060 | 6/1995 | Roberts et al. | 375/371 |

*Primary Examiner*—Stephen Chin
*Assistant Examiner*—Amanda T. Le
*Attorney, Agent, or Firm*—Baker & Botts, L.L.P.

[57] ABSTRACT

A high speed signal transport system (10) provides data transmission across a balanced channel (14). The balanced channel (14) carries differential signals from the output of a differential transmitter (12). An equalizer (18) compensates for distortion in the balanced channel in order to reduce timing jitter of the signal. The signal is applied to the input of a differential receiver (20) which exploits the precise quantization threshold inherent in differential data to accurately convert the signal to digital data. The differential receiver (20) also employs a known frequency reference along with digital transition detection to rephase the digital data to the local clock. No duty-cycle limitation is placed on the signal carried by the balanced channel (14) and therefore the differential transmitter (12) and differential receiver (20) are not required to encode the signal. Because the signal-to-noise ratio seen by the differential receiver (20) is ample for accurate quantization, the equalizer (18) is optimized for jitter reduction in order to obviate the need for analog retiming circuits.

20 Claims, 2 Drawing Sheets

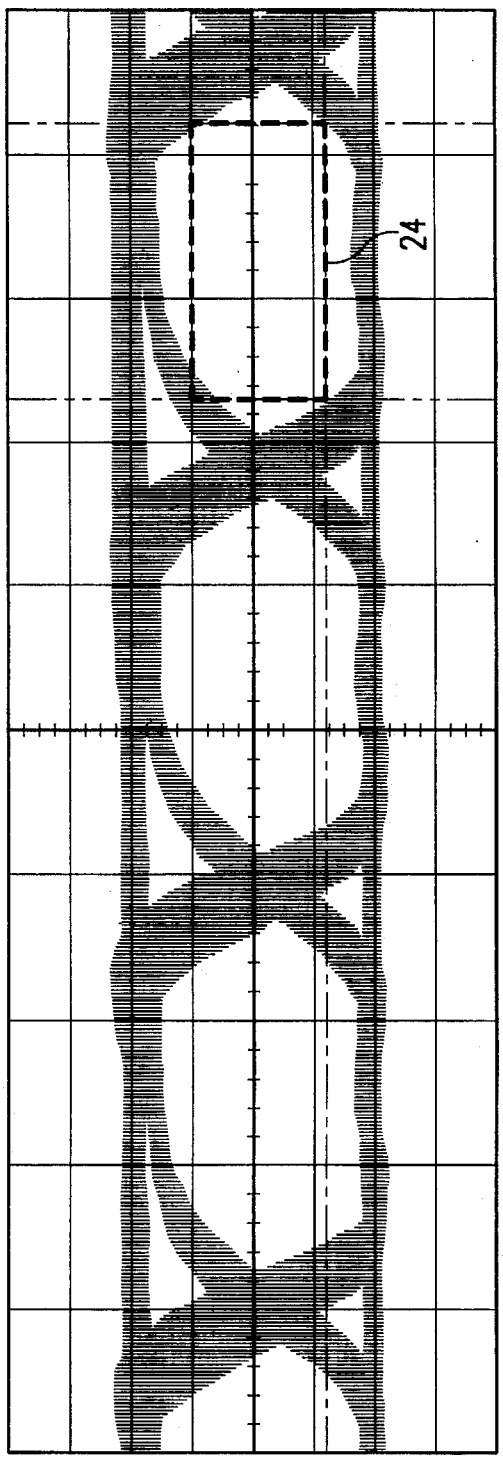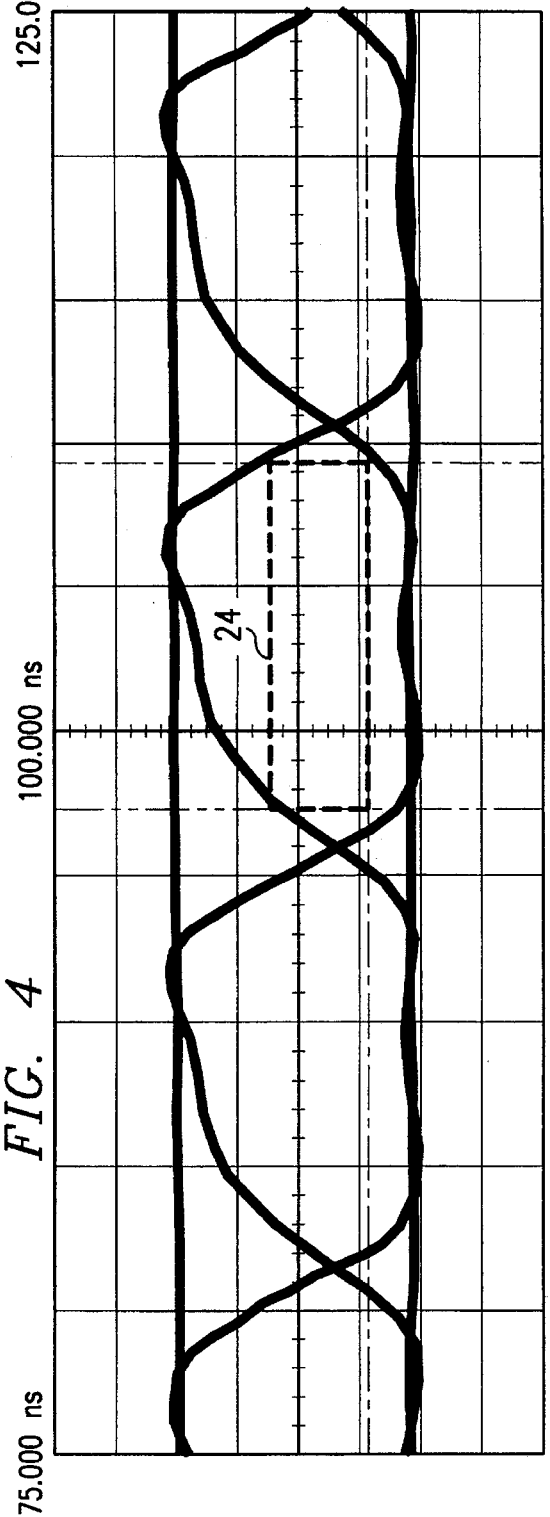

HIGH SPEED TRANSPORT SYSTEM

TECHNICAL FIELD OF THE INVENTION

The present invention relates in general to systems of high speed electrical signal transport within large equipment systems, and more particularly to such systems as used within telecommunications cross-connect devices.

BACKGROUND OF THE INVENTION

Traditional signal transport systems include a sender and a receiver connected by a communications channel. The receiver includes a quantizer that converts the signal into digital form. The receiver needs to present the quantizer with adequate signal-to-noise ratio in order to maintain the desired level of bit errors.

In the case of a single-ended, or unbalanced, channel, the signal must be strong enough to overcome not only noise, but also the threshold uncertainty inherent in single-ended quantizers. Passive and active filter networks have been employed to compensate for channel-induced distortion so as to improve the signal-to-noise ratio in the middle of each bit cell time. These filter networks have the effect of increasing the timing uncertainty of the edges of the bit cell, thus causing jitter that must be removed by means of additional analog circuits, termed "retiming circuits" such as a resonant tank circuit or a phase-locked loop.

The analog retiming circuits typically require that the signal be encoded in such a way as to ensure a minimum transition density to carry the timing information. Non-return to zero representation of random binary data, while the simplest to implement, can not guarantee a transition density. Encoding is also required to allow the quantizer to find the average signal voltage that is used as the decision threshold. The analog retime circuit, as well as the encoder and decoder logic, add considerable complexity to the transport system.

The complexity of encoding and retiming is extremely undesirable in the case of large equipment that contains hundreds or thousands of signals needing transport. At high signal speeds, however, the simpler techniques of synchronous transport suffer from the effects of signal loss, distortion, and timing skew.

From the foregoing, it may be appreciated that a need exists for a high speed signal transport technique that is suitable for the high density and physical dispersion of much modern equipment, in particular telecommunications cross-connect systems.

SUMMARY OF THE INVENTION

In accordance with the present invention, a high speed transport system is provided Which substantially eliminates or reduces disadvantages and problems associated with conventional telecommunication system data transmission.

According to an embodiment of the present invention, there is provided a high-speed signal transport system that does not employ analog retime circuits or encoding/decoding circuits and is intended to be used between parts of a large equipment system that have a common clock frequency reference. The high speed transport system uses well-established digital techniques of determining the relative phase of the received bit stream by detecting the location of occasional transitions and retiming the digital data when provided with an exact frequency reference. The frequency-coherent digital retime circuits are provided with digital signals that have very low timing uncertainty at the edges of the bit cell without the use of analog retiming circuits.

According to this embodiment, the high-speed transport system includes a differential, or balanced, communications channel provided by a twisted-pair cable. A balanced sender and receiver are also provided. Furthermore, a balanced filter circuit, or equalizer, is provided between the channel and the receiver.

The balanced receiver in this invention reduces the threshold uncertainty in the quantization process and therefore improves the signal-to-noise ratio. Combined with the limited distance that must be spanned within a large equipment system (usually limited to three hundred feet), there is sufficient signal-to-noise ratio present at the receiver to establish accurate quantization without the need for filter circuits to improve the amplitude in the middle of the bit cell. Therefore, this invention provides a balanced filter circuit, or equalizer, that reduces the timing uncertainty of the edges of the bit cell by reducing the jitter of the signal zero-crossings that are presented to the quantizer.

The high speed signal transport system of the present invention provides various technical advantages over the previous art. The sender and receiver circuits are very simple and require relatively few analog components and thus provide for high-density implementations suitable for the transport of hundreds or thousands of signals inexpensively. Another advantage is that the method exploits the ample signal-to-noise ratio available with balanced signals carried over cables of dozens or hundreds of feet in length to optimize the signal presented to the quantizer for minimum jitter, allowing the use of high-density, inexpensive digital techniques to retime the recovered data to the local clock source.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 illustrates a graph of the signal response carried over the high speed transport system without equalization; and FIG. 4 illustrates a graph of the signal response carried over the high speed transport system with equalization.

DETAILED DESCRIPTION OF THE INVENTION

Figure 1:
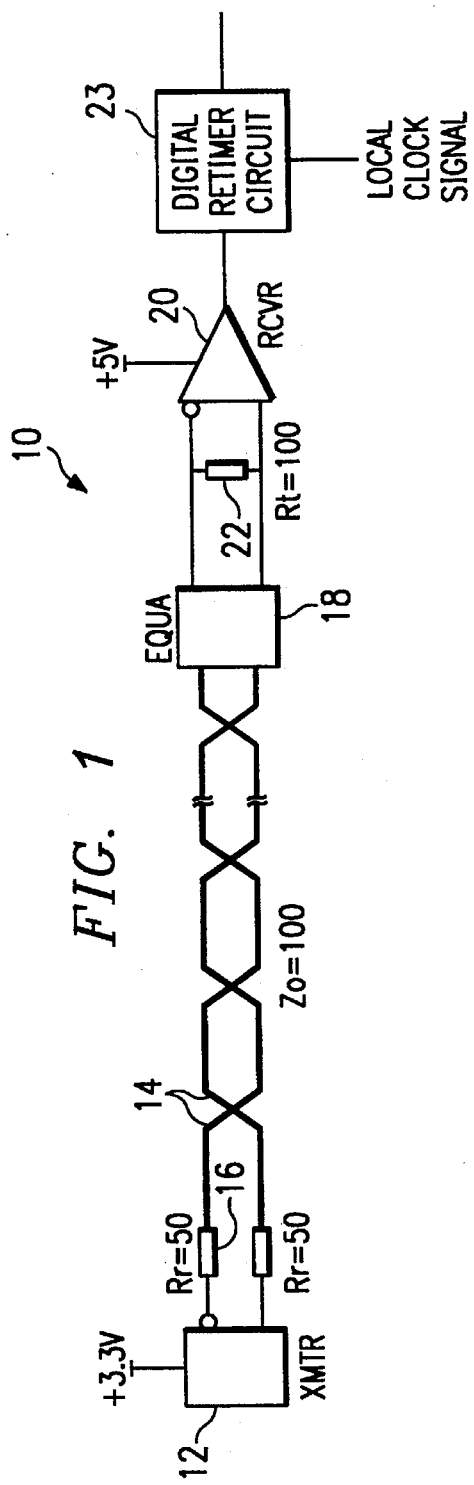
FIG. 1 illustrates a block diagram of a high speed transport system.

FIG. 1 is a block diagram of a high speed transport system 10. High speed transport system 10 includes a differential transmitter 12 that provides differential outputs to a balanced channel 14. Signals from each differential output of differential transmitter 12 are tied to a termination resistor 16 before preceding onto balanced channel 14. Balanced channel 14 is coupled to an equalizer 18. Equalizer 18 is coupled to a differential receiver 20. A receiver termination resistor 22 is connected across the differential inputs of differential receiver 20. Differential receiver 20 supplies a received signal to a digital retimer circuit 23.

The differential nature of high speed transport system 10 and the use of equalizer 18 greatly reduce the complexity involved with data transmission. No duty cycle constraints are placed on the differential signals. No encoding is performed at differential transmitter 12 to maximize the signal to noise ratio at differential receiver 20. By applying high speed transport system 10 in a high density high speed network, maximum signal to noise ratio at differential receiver 20 is not required. The quantization level is provided by the zero crossings of the differential signal, alleviating the problem of dc offset between differential transmitter 12 and differential receiver 20. Equalizer 18 ensures that the zero crossings of the differential signal are detected through the removal of noise and jitter. Discussion of a specific embodiment follows.

Differential transmitter 12 is preferably a D type flip flop biased from a 3.3 volt DC power supply. For differential transmitter 12, longitudinal termination is not required. However, reverse termination at the differential outputs of differential transmitter 12 may be employed to eliminate any reflected signal on the line. Transmitter termination resistors 16 provide the reverse termination at the differential outputs of differential transmitter 12. Transmitter termination resistors 16 also limit output current from differential transmitter 12. Specific values for transmitter termination resistors 16 are preferably one-half the output impedance of balanced channel 14. Thus, for a 100 Ohm output impedance on balanced channel 14, transmitter termination resistors 16 have a value of approximately 50 Ohms. Data from differential transmitter 12 travels differentially through differential wire pairs across balanced channel 14.

Balanced channel 14 is preferably a twisted pair solid wire, low cross talk, low loss cable though a different coaxial cable may also be used. To achieve low losses, polymeric materials including polyethylene or polypropylene dielectrics with low dissipation factors are used in balanced channel 14. Polyvinylchloride has a high dissipation factor which would make it difficult or impossible to equalize the signals within balanced channel 14. However, polyvinylchloride can be used as the external jacket for balanced channel 14. The wire pairs may be enshrouded into a longitudinal malar/aluminum foil with a 26 AWG drain wire. To provide low cross talk, balanced channel 14 preferably has a maximum of 30 dB of near cross talk at 70 MHz and along a straight line therefrom with a slope of −15 dB in a logarithmic frequency scale. Balanced channel 14 preferably is wired to correspond to the transmitter-receiver polarity. To ensure proper polarity, differential transmitter 12 positive outputs are coupled to differential receiver 20 positive inputs.

Digital retimer circuit 23 uses established digital techniques for determining a relative phase of the received digital bit stream from differential receiver 20. The relative phase is determined by detecting the location of occasional low jitter transitions in the digital bit stream and retiming the digital data through a local clock signal. Equalizer 18 provides digital retimer circuit 23 with digital data that has very low timing uncertainties at the edges of the bit cells by reducing the jitter at the zero crossings of the signal. Therefore, there is sufficient signal to noise ratio present at differential receiver 20 to establish accurate quantization levels and reduce threshold uncertainty without the necessity for encoder and filter circuits to improve the amplitudes in the bit cells for threshold detection.

Figure 2:
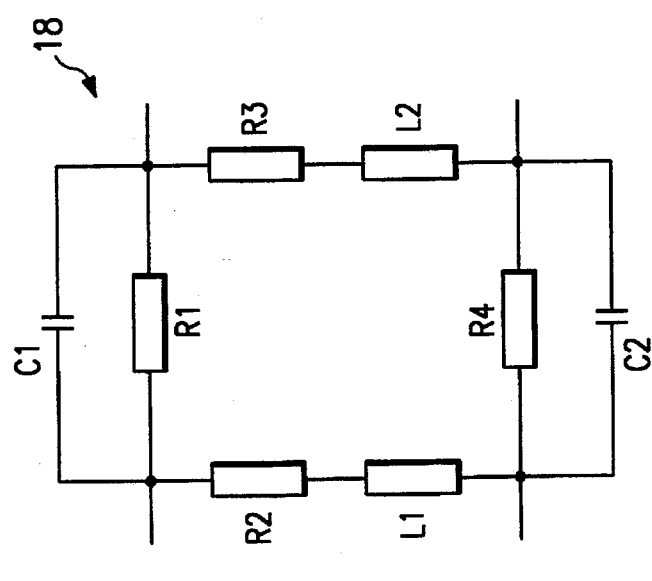
FIG. 2 illustrates a schematic block diagram of an equalizer used in the high speed transport system.

FIG. 2 is a schematic block diagram of equalizer 18. Equalizer 18 includes a resistor R1 in parallel with a capacitor C1, a resistor R4 in parallel with a capacitor C2, a resistor R2 in series with an inductor L1, and a resistor R3 in series with an inductor L2. Equalizer 18 is based on the balanced topology of balanced channel 14 where two voltages of the differential signal are referenced to each other instead of to a ground voltage. The circuitry frequency response of equalizer 18 is opposite to that of balanced channel 14. Thus, as attenuation of balanced channel 14 increases with frequency, equalizer 18 attenuates more at lower frequencies. Such a relationship shows that the response of equalizer 18 is similar to a high pass filter. However, equalizer 18 is designed on time domain principles based on jitter performance of the differential signals through balanced channel 14. By using time domain principles, equalizer 18 provides the best results for reducing jitter on the differential signals carried by balanced channel 14 but not necessarily the best results in the frequency domain.

Equalizer 18 has a DC attenuation of 7 dB and an input output impedance of 100 Ohms. Preferable values for each component within equalizer 18 are shown in Table I.

TABLE I

| | |
|---|---|
| R1 | 45 Ohms +/− 1% at ⅛Watt |
| R2 | 260 Ohms +/− 1% at ⅛Watt |
| R3 | 260 Ohms +/− 1% at ⅛Watt |
| R4 | 45 Ohms +/− 1% at ⅛Watt |
| C1 | 390 picofarads +/− 5% at 50 Volts |
| C2 | 390 picofarads +/− 5% at 50 Volts |
| L1 | 3.9 microhenrys +/− 10% |
| L2 | 3.9 microhenrys +/− 10% |

Balanced channel 14 can range in length preferably up to 300 feet and still be equalized by equalizer 18. Equalizer 18 may be positioned anywhere along balanced channel 14. However, for possible signal to noise ratio advantages, equalizer 18 is positioned at the differential receiver 20 end of balanced channel 14. For use in a broadband system, balanced channel 14 has 12 twisted pairs carrying signals at a frequency of 51.84 Mb/sec. For a wideband system, balanced channel 14 has 8 twisted pairs carrying signals at a frequency of 68.672 Mb/sec.

Differential receiver 20 preferably operates at a +5 Volt DC power supply and provides a TTL compatible output signal. At the input of differential receiver 20, balanced channel 14 is terminated on a receiver termination resistor. Receiver termination resistor 22 preferably has a value of 100 Ohms +/− 1% at ⅛ Watt.

FIG. 3 shows a graph of the differential signal at an output of differential receiver 20 carried over balanced channel 14 without the benefit of equalizer 18. Without equalization, the graph shows the noise and jitter on signals carried by balanced channel 14. The noise and jitter effectively reduce a spacing identified by a window area 24 between the zero crossings of the differential signal that can affect detection and processing by differential receiver 20 and digital decision making devices connected to differential receiver 20.

FIG. 4 shows a graph of the differential signal on balanced channel 14 with equalizer 18 installed. An equalizer 18 is installed for each wire pair of balanced channel 14. With equalization, noise and jitter are reduced and window area 24 increases. For proper pulse identification, window area 24 has a minimum length value between zero crossings of the differential signal. This minimum length value ensures proper clocking operation for devices connected to differential receiver 20. Preferably, the minimum length value of window area 24 is approximately 10.7 ns for broadband systems and 7.8 ns for wideband systems. The minimum length value may be adjusted depending on design requirements.

In summary, a high speed transport system uses a balanced channel to transport high frequency signals in broadband and wideband rates of a telecommunication system. An equalizer enables the balanced channel to carry high frequency signals with improved signal response and decreased noise and jitter.

Thus, it is apparent that there has been provided, in accordance with the present invention, a high speed transport system that satisfies the advantages set forth above. Although the preferred embodiment has been described in detail, it should be understood that various changes, substitutions, and alterations can be made herein. For example, other types of differential receivers and transmitters and different values of equalizer elements may be employed with similar signal response across the balanced channel. Other examples are readily ascertainable by one skilled in the art and could be made without departing from the spirit and scope of the present invention as defined by the following claims.

What is claimed is:

1. A high speed transport system, comprising:

a balanced channel for carrying a differential signal; and an equalizer coupled to said balanced channel for reducing timing jitter on said differential signal carried by said balanced channel, wherein said differential signal is transmitted by a non-encoding sender and no duty cycle constraints are placed on said differential signal, wherein said equalizer provides sufficient signal to noise ratio on said differential signal without the use of a filter circuit.

2. The high speed transport system of claim 1, wherein said balanced channel is a differential coaxial cable.

3. A high speed transport system, comprising:

a differential receiver for transmitter for transmitting a differential signal;

a differential receiver for receiving said differential signal;

a balanced channel coupled to said differential transmitter and said differential receiver for carrying said differential signal from said differential transmitter to said differential receiver;

an equalizer coupled to said balanced channel for reducing timing jitter on said differential signal carried by said balanced channel, wherein said differential transmitter is a non-encoding sender and no duty cycle constraints are placed on said differential signal;

a digital retimer circuit coupled to said differential receiver for rephasing digital data from said differential receiver to a local clock signal that corresponds to a data rate of said digital data, said digital retimer circuit determining a phase of said digital data by detecting occasional low jitter transitions.

4. A high speed transport system, comprising:

a differential transmitter for transmitting a differential signal;

a differential receiver for receiving said differential signal;

a balanced channel coupled to said differential transmitter and said differential receiver for carrying said differential signal from said differential transmitter to said differential receiver;

an equalizer coupled to said balanced channel for reducing timing jitter on said differential signal carried by said balanced channel, wherein said differential transmitter is a non-encoding sender and no duty cycle constraints are placed on said differential signal, and wherein said equalizer maintains a minimum spacing between zero crossings of said differential signal to ensure proper detection of a digital representation of said differential signal.

5. A high speed transport system, comprising:

a differential transmitter for transmitting a differential signal;

a differential receiver for receiving said differential signal;

a balanced channel coupled to said differential transmitter and said differential receiver for carrying said differential signal from said differential transmitter to said differential receiver;

an equalizer coupled to said balanced channel for reducing timing jitter on said differential signal carried by said balanced channel, wherein said differential transmitter is a non-encoding sender and no duty cycle constraints are placed on said differential signal, and wherein said equalizer minimizes timing jitter performance of said differential signal based on time domain principles.

6. A high speed transport system, comprising:

a differential transmitter;

a differential receiver;

a twisted pair cable coupled to said differential transmitter and said differential receiver for communicating a differential signal from said differential transmitter to said differential receiver;

a cable equalizer coupled to said twisted pair cable for reducing jitter noise on said differential signal carried by said twisted pair cable, wherein said differential transmitter is a non-encoding sender and no duty cycle constraints are placed on said differential signal; and a digital retimer circuit coupled to said differential receiver for rephasing digital data from said differential receiver to a local clock signal that corresponds to a data rate of said digital data, said digital retimer circuit determining a phase of said digital data by detecting occasional low jitter transitions.

7. The high speed transport system of claim 6 further comprising:

a transmitter termination resistor coupled to said twisted pair cable at said differential transmitter for providing reverse termination at an output of said differential transmitter to eliminate a reflected signal on said twisted pair cable, said transmitter termination resistor limiting an output current of said differential transmitter.

8. The high speed transport system of claim 7, wherein said transmitter termination resistor has a value of one half of an output impedance of said twisted pair cable.

9. The high speed transport system of claim 6, further comprising:

a receiver termination resistor coupled to said twisted pair cable at said differential receiver for providing termination at an input of said differential receiver.

10. The high speed transport system of claim 6, wherein said cable equalizer is positioned at an end of said twisted pair cable in a vicinity of said differential receiver for signal to noise ratio advantages.

11. The high speed transport system of claim 6, wherein said cable equalizer is designed based on time domain principles.

12. The high speed transport system of claim 6, wherein said twisted pair cable has wire insulation made of a dielectric material with a virtually zero dissipation factor.

13. The high speed transport system of claim 12, wherein said dielectric material includes either polyethylene or polypropylene.

14. The high speed transport system of claim 6, wherein said twisted pair cable has a maximum near cross talk specification of 30 dB at 70 MHZ and along a straight line with slope −15 db therefrom in a logarithmic frequency scale.

15. A high speed transport system, comprising:
   a differential transmitter;
   a differential receiver;
   a twisted pair cable coupled to said differential transmitter and said differential receiver for communicating full duplex differential signals from said differential transmitter to said differential receiver, said twisted pair cable transporting said differential signal in broadband and wideband frequency ranges, wherein said differential transmitter is a non-encoding sender and no duty cycle constraints are placed on said differential signal;
   a transmitter termination resistor coupled to said twisted pair cable at said differential transmitter for providing reverse termination at an output of said differential transmitter to eliminate a reflected signal on said twisted pair cable, said transmitter termination resistor limiting an output current of said differential transmitter;
   a receiver termination resistor coupled to said twisted pair cable at said differential receiver for providing termination at an input of said differential receiver; and
   a cable equalizer coupled to said twisted pair cable for reducing jitter noise on signals carried by said twisted pair cable, said cable equalizer having a design based on time domain principles.

16. The high speed transport system of claim 15, wherein said cable equalizer maintains a minimum spacing between zero crossings of a differential signal at an output of said differential receiver.

17. The high speed transport system of claim 16, wherein said minimum spacing is 7.8 ns for wideband systems and 10.7 ns for broadband systems.

18. The high speed transport system of claim 15, wherein said cable equalizer is positioned at an end of said twisted pair cable in a vicinity of said differential receiver to enhance signal to noise ratio requirements.

19. The high speed transport system of claim 15, wherein said twisted pair cable has a maximum near cross talk specification along a straight line with a slope of −15 db from a value of 30 db at a frequency of 70 MHz on a logarithmic frequency scale.

20. The high speed transport system of claim 15, further comprising:
   a digital retimer circuit coupled to said differential receiver for rephasing digital data from said differential receiver to a local clock signal that corresponds to a data rate of said digital data, said digital retimer circuit determining a phase of said digital data by detecting occasional low jitter transitions.

* * * * *